Figure 4:
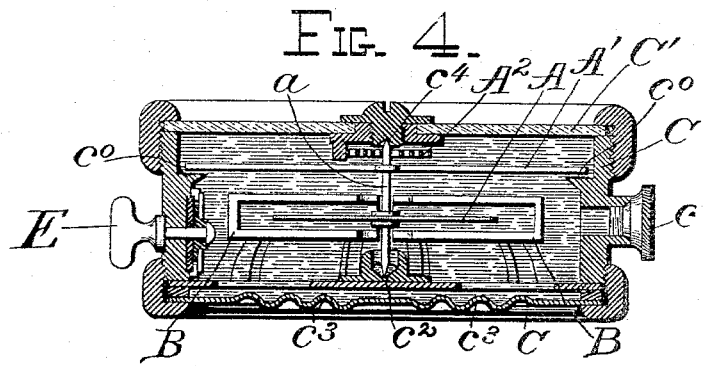

(No Model.) 3 Sheets—Sheet 1.
H. A. ROWLAND.
ELECTROSTATIC VOLTMETER.
No. 531,970. Patented Jan. 1, 1895.
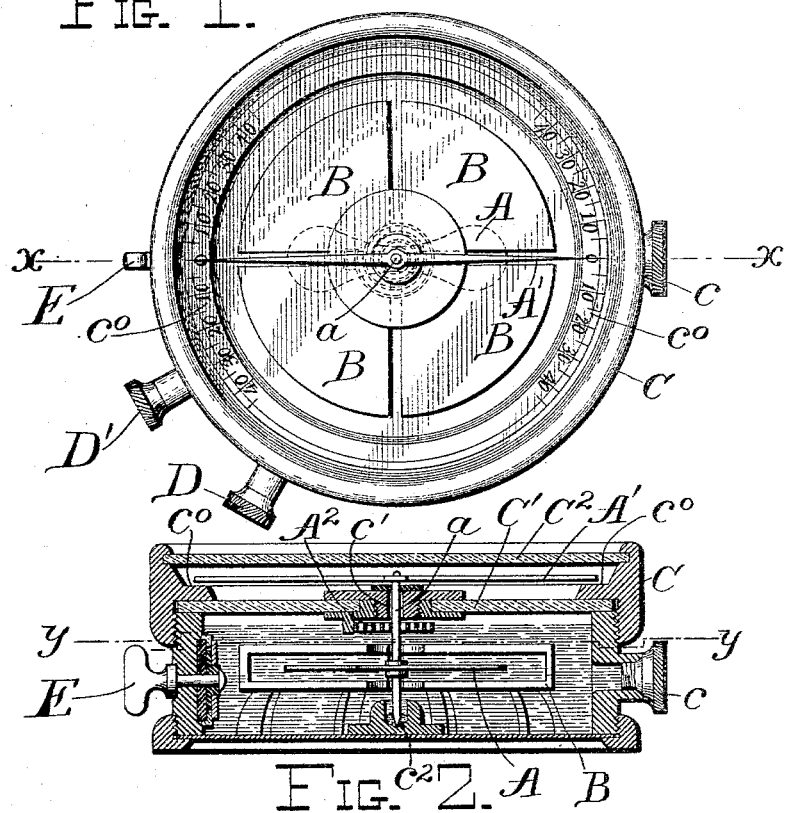
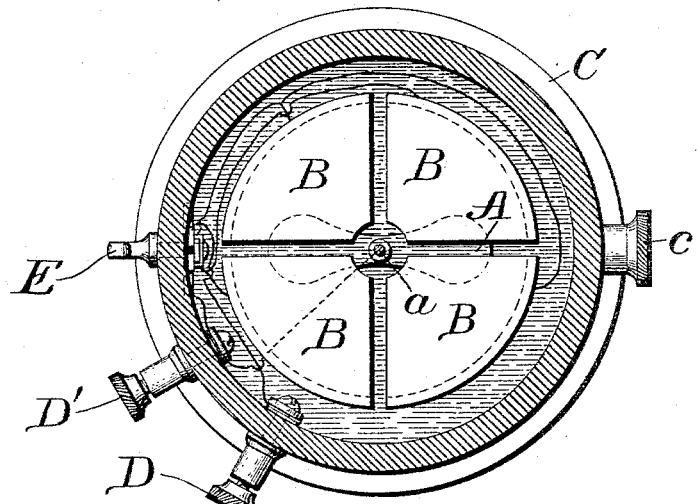
Witnesses
Percy C. Bowen.
John C. Wilson.
Inventor
Henry A. Rowland,
by Whitman & Wilkinson,
Attorneys.

(No Model.) 3 Sheets—Sheet 2.

H. A. ROWLAND.
ELECTROSTATIC VOLTMETER.

No. 531,970. Patented Jan. 1, 1895.

Witnesses
Percy C. Bowen
John C. Wilson

Inventor
Henry A. Rowland
By Whitman & Wilkinson,
Attorneys.

(No Model.) 3 Sheets—Sheet 3.

H. A. ROWLAND.
ELECTROSTATIC VOLTMETER.

No. 531,970. Patented Jan. 1, 1895.

Witnesses
Percy C. Bowen.
John C. Wilson.

Inventor
Henry A. Rowland,
by Whitman & Wilkinson
Attorneys.

UNITED STATES PATENT OFFICE.

HENRY A. ROWLAND, OF BALTIMORE, MARYLAND.

ELECTROSTATIC VOLTMETER.

SPECIFICATION forming part of Letters Patent No. 531,970, dated January 1, 1895.

Application filed February 24, 1894. Serial No. 501,414. (No model.)

*To all whom it may concern:*

Be it known that I, HENRY A. ROWLAND, a citizen of the United States, residing at Baltimore, in the State of Maryland, have invented certain new and useful Improvements in Electrostatic Voltmeters; and I do hereby declare the following to be a full, clear, and exact description of the invention, such as will enable others skilled in the art to which it appertains to make and use the same.

My invention relates to improvements in instruments for measuring the differences of electrical potential, and especially to that class of instruments known as electro-static voltmeters; and it consists of certain novel features which will be hereinafter described and claimed.

It is known to electricians that the electrostatic forces between bodies are greater in proportion to the specific inductive capacity of the surrounding medium. Furthermore, the spaces between the attracting bodies can be made smaller in a liquid where the insulation is greater than in air, and thus the forces can be still further increased. Again, the moving parts of an electrometer can be made to float in a liquid, while the viscosity of the liquid will damp the motion of these parts, and so prevent excessive vibration, and also bring the needle earlier into a position of rest. For all these reasons it is possible to construct an electrometer, which shall be very sensitive, with its working parts immersed in a non-conducting liquid, and thus, while the moving parts may be perfectly free to move, they may not oscillate to any extent, and will come to rest in a perfectly periodic manner. Furthermore, as all the delicate parts are materially buoyed up by the liquid, almost floating therein, the instrument is not so likely to be injured by rough treatment, as where the said parts are placed in a chamber filled with air, and thus the instrument is adapted to stand rougher treatment than is practicable with instruments now in use. As liquids, adapted for use for this purpose, I propose to use any liquid of sufficient insulation and high specific inductive force. Such liquids are the various kinds of oil, either mineral, animal or vegetable, the oil of turpentine, bisulphide of carbon, chloroform, the various kinds of ether and alcohol, and for measuring low voltage, even very pure water may be employed. To make a vessel in which the whole instrument can be incased, some allowance for expansion must be made, and to effect this, I propose to make either the bottom or sides of the vessel corrugated, or of metal sufficiently thin to be bulged out; or to inclose some air in the chamber with the liquid, which, by compression, will allow a slight change in the volume of the liquid, without subjecting the inclosing vessel to undue strains.

The accompanying drawings illustrate some of the modes of applying my invention to practical purposes.

Figure 5:
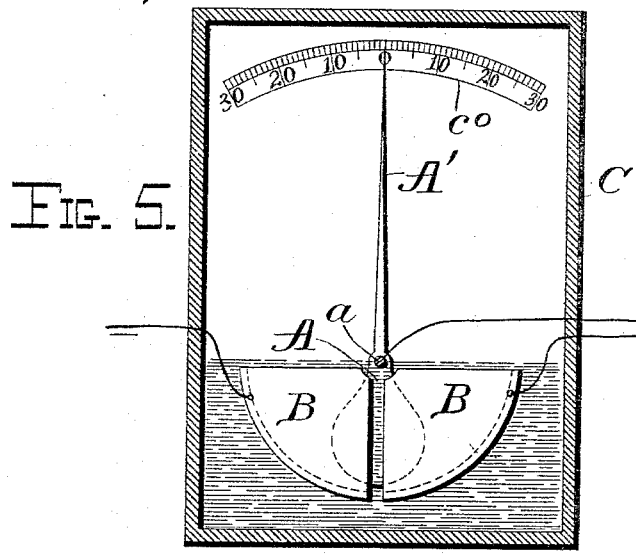
Figures 6, 7:
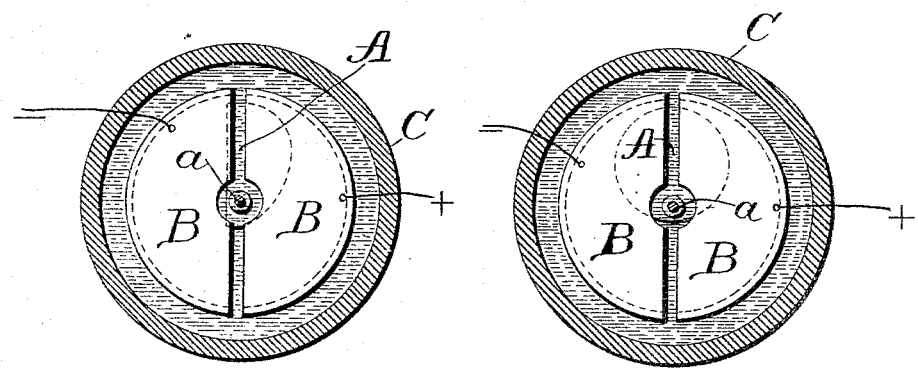
Figure 8:
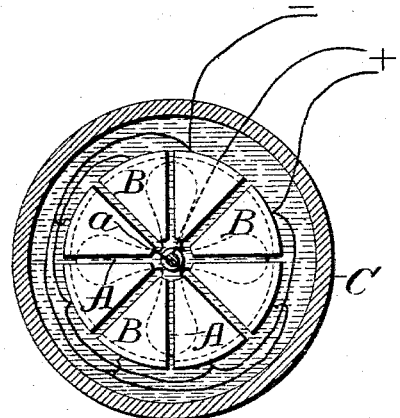
Figure 9:
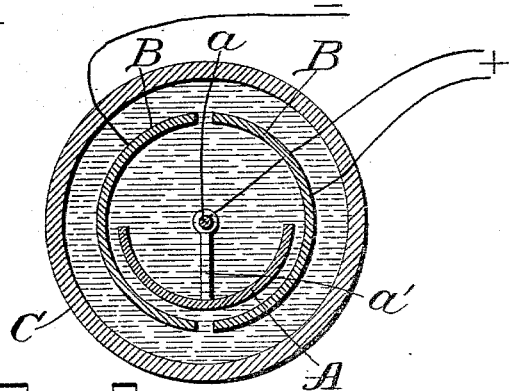
Figure 10:
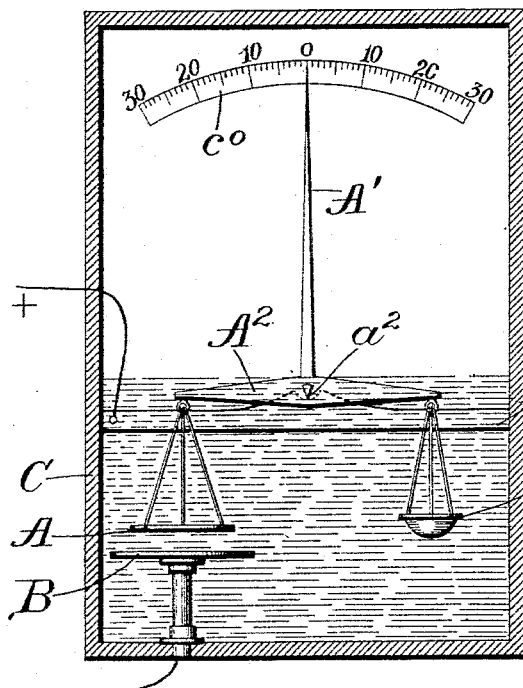
Figure 11:
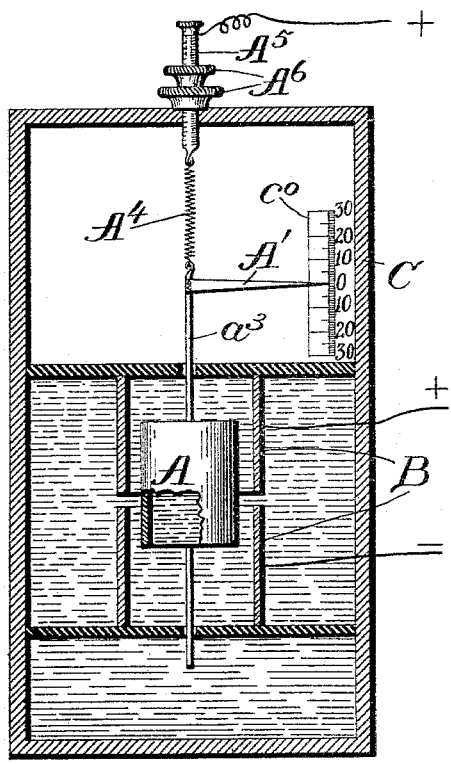

Figure 1 represents a plan view; Fig. 2, a section along the line $x\ x$ of Fig. 1, and Fig. 3 a section along the line $y\ y$ of Fig. 2, all showing one form of electro-static voltmeter in which the needle and induction surfaces are immersed in a liquid, and the pointer is above the liquid. Fig. 4 represents a similar instrument to that shown in Figs. 1 to 3, except that the pointer is in the liquid, and the bottom of the case is corrugated to allow for expansion of the liquid. Fig. 5 represents a section of another form of device in which the induction surfaces and the needle are immersed in the liquid, and the pointer projects vertically upward therefrom, into an air space at the top of the case. Figs. 6 and 7 represent sectional views similar to that shown in Fig. 3, except that the induction surfaces and the needle are varied in form somewhat from that shown in the said Fig. 3. Fig. 8 shows another form of induction surfaces and needle, being the form now largely in use, the same being a section similar to that shown in Fig. 3. Fig. 9 represents a horizontal section similar to that in Fig. 3, in which the induction surfaces are in the form of broken cylinders, and the needle in the form of a section of a cylinder having the same axis, but a less diameter than that of the induction surfaces. Fig. 10 represents a voltmeter in which the attracting surface is in the form of a flat circular plate, and the surface to be attracted corresponding to the needle, is attached to one end of the balance, the other arm of the balance carrying a scale pan, the balance and other parts being immersed in a liquid, and the pointer projecting above the said liquid. Fig. 11 represents another form of the device in which the part of the voltmeter to be attracted is in the form of a hollow cylinder, and is sucked up or down in a broken hollow cylinder inclosing the same, the operative parts being immersed in liquid.

To describe the figures in detail, A represents in all of the figures the needle or equivalent part which is moved by the electro-static forces, and operates the pointer A' causing it to move along the scale $c^0$.

B in all of the figures represents the metallic bodies which attract or repel the needle when charged from the source of electricity. These bodies as ordinarily constructed, are known as quadrants, and extend on either side of the needle, as shown in Figs. 2 and 4.

C represents the inclosing case which may be of any form desired.

D and D' represent the binding posts for connecting the terminals to the instrument, and E shown only in Figs. 1 to 4 represents a reverser or switch for changing the direction of the current.

In the form of device shown in Figs. 1 to 3, the case C is provided with two glass covers C' and $C^2$, in the lower one of which the spindle $a$ revolves freely at $c'$, which spindle rests upon an anti-friction bearing $c^2$ near the base of the instrument. The pointer A' swings over the graduated arc $c^0$ in the air space between the two glass covers C' and $C^2$. A small air space is also left beneath the inner glass cover C' to allow for the expansion of the inclosed liquids. The needle A is moved against the tension of the spring $A^2$.

It will be seen that in the before described form of device an opaque liquid may be used if desired.

In the form of device shown in Fig. 4, all the moving parts are immersed in the liquid, and provision is made for expansion by the corrugations $c^3$ which are represented as being in the base of the case, but which may be in the sides if preferred. In this form of device the spindle $a$ is held between the anti-friction bearings $c^2$ and $c^4$. In order to read the scale $c^0$ a translucent or transparent liquid should preferably be used, but it will be evident that the said scale may be placed around the inner edge of the cap if preferred.

In the form of device shown in Figs. 1 to 4, a screw plug $c$ is used to close the hole provided in the case for the admission of the liquid.

Figs. 5 to 11 are intended rather as diagrammatic views, than as illustrations of complete operative devices.

In Fig. 5 the spindle $a$ is pivoted horizontally, and a deflection of the needle out of the perpendicular is indicated by the pointer moving along the overhead scale.

Figs. 6 and 7 show a modified form of needle swinging between semi-circular attracting bodies, or "quadrants" so-called.

In both forms of device the spindle $a$ may be either vertical or horizontal, and the pointer is not shown.

In the device shown in Fig. 8 a needle provided with four blades, moves between eight similar attracting or repelling bodies. In this form of device the spindle $a$ is vertical, and the electrical connections are made as indicated.

In the device shown in Fig. 9, the spindle $a$ is vertical, and carries the curved needle A rigidly attached to an arm $a'$ projecting from the said spindle $a$. The cylindrical bodies B, which are cut away along opposite elements, as shown, are made concentric with the curved needle A, and with the spindle $a$.

In the form of device shown in Fig. 10, the balance $A^2$ is pivoted on a knife edge $a^2$ which rests on the beam $A^0$ set across the instrument case. The attraction or repulsion of the surfaces A and B is measured by the weights in the opposite scale pan $A^3$, or by the distance the pointer A' travels along the overhead scale $c^0$.

In the form of device shown in Fig. 11 the hollow cylinder or needle A forms a core for the broken cylinder B, and the pointer A' attached to the guide rod $a^3$ moves along the scale, and indicates the amount of deflection. The said rod $a^3$ is suspended by the spring $A^4$ from the screw $A^5$, which is held in any desired position by the double nut $A^6$.

In all the various figures, the electrical connections are indicated by solid lines.

While the herein described devices represent various methods of applying my invention to electrometers, it will be obvious that various other modifications could be made without departing from the spirit of my invention.

It will be evident that any of the herein described devices may be made multicellular if desired; also that any of the needles may be made hollow like that shown in Fig. 11 or may be buoyed up in any convenient way, as by attaching a float. It will also be evident that a commutator might be used for reversing the deflections of the needle.

The herein described device while described with especial reference to use as a volt-meter, is equally applicable to use as a Watt meter.

It will be evident that any of the various modifications herein described may be adjusted for use as a zero instrument. Thus weights might be put in the pan $A^3$ sufficient to deflect the pointer A' through such a distance on the scale $c^0$ that it will take a given difference of electric potential to bring the said pointer back to the zero point on the scale. In the same way the tension of the spring $A^4$ of Fig. 11 might be so adjusted as to move the pointer A' away from the zero point on the scale to which point it will be brought back by a known difference of electric potential.

Having thus described my invention, what I claim, and desire to secure by Letters Patent of the United States, is—

1. An electrostatic volt-meter, having its attracting and attracted parts immersed in a non-conducting liquid, substantially as and for the purposes described.

2. An electrostatic volt-meter having its attracting and attracted parts immersed in a non-conducting liquid of high specific inductive capacity, substantially as and for the purposes described.

3. An electrostatic volt-meter, having a hollow movable needle immersed in a non-conducting liquid, substantially as and for the purposes described.

4. An electrostatic volt-meter, having a hollow movable needle immersed in a non-conducting liquid, of high specific inductive capacity, substantially as and for the purposes described.

5. In an electro-static voltmeter, the combination with a fixed attracting body immersed in a non-conducting liquid, of a movable attracted body also immersed in said liquid and in close proximity to said attracting body, and means for measuring the movement of said movable body, substantially as and for the purposes described.

6. In an electric volt-meter, the combination with a fixed attracting body immersed in a non-conducting liquid, of a movable attracted body also immersed in said liquid and in proximity to the fixed body, and springs connected to said movable body and tending to draw it to the zero or initial position, substantially as described.

7. In an electric volt-meter, the combination with a fixed attracting body immersed in a non-conducting liquid, of a movable attracted body also immersed in said liquid, and in proximity to said fixed body, a pointer operated by said movable body, a fixed scale, and springs for adjusting the tension on said movable body and so regulating the movement of said pointer along said scale, substantially as described.

8. In an electro-static voltmeter, the combination with a fixed attracting body immersed in a non-conducting liquid of high specific inductive capacity, of a movable attracted body also immersed in said liquid at a fixed distance from and in close proximity to said attracting body, and a pointer operated by said movable body, substantially as and for the purposes described.

9. In a device of the character described, the combination with a case provided with corrugations therein and filled with a non-conducting liquid, of a voltmeter inclosed wholly within said case and immersed in said liquid, substantially as and for the purposes described.

10. In a device of the character described, the combination with a case provided with corrugations therein and filled with a non-conducting liquid, of high specific inductive capacity, of a voltmeter inclosed wholly within said case and immersed in said liquid, substantially as and for the purposes described.

11. In an electro-static voltmeter the combination with a fixed attracting body immersed in a non-conducting liquid, of a hollow movable attracted body also immersed in said liquid and buoyed up thereby, the said movable body being in close proximity to said fixed body, and means for measuring the movement of said movable body, substantially as and for the purposes described.

12. In an electro-static voltmeter, the combination with a fixed attracting body immersed in a non-conducting liquid of high specific inductive capacity, of a hollow movable attracted body also immersed in said liquid and buoyed up thereby, the said movable body being immersed in said liquid at a fixed distance from and in close proximity to said movable body; and means for measuring the movement of said movable body, substantially as and for the purposes described.

In testimony whereof I affix my signature in presence of two witnesses.

HENRY A. ROWLAND.

Witnesses:
   THOS. M. DOBBIN,
   WILLIAM H. BERRY.